United States Patent
Conway

(10) Patent No.: US 7,334,102 B1
(45) Date of Patent: Feb. 19, 2008

(54) APPARATUS AND METHOD FOR BALANCED SPINLOCK SUPPORT IN NUMA SYSTEMS

(75) Inventor: Patrick Conway, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 771 days.

(21) Appl. No.: 10/434,692

(22) Filed: May 9, 2003

(51) Int. Cl.
*G06F 12/00* (2006.01)
(52) U.S. Cl. .................. 711/163; 711/151; 711/152
(58) Field of Classification Search ................ 711/151, 711/152
See application file for complete search history.

(56) References Cited

U.S. PATENT DOCUMENTS

| | | | |
|---|---|---|---|
| 4,197,580 A | 4/1980 | Chang et al. |
| 5,375,216 A | 12/1994 | Moyer et al. |
| 5,535,116 A | 7/1996 | Gupta et al. |
| 5,553,265 A | 9/1996 | Abato et al. |
| 5,680,576 A | 10/1997 | Laudon |
| 5,727,150 A | 3/1998 | Laudon et al. |
| 5,829,025 A | 10/1998 | Mittal |
| 5,829,028 A | 10/1998 | Lynch et al. |
| 5,850,534 A | 12/1998 | Kranick |
| 5,996,048 A | 11/1999 | Cherabuddi et al. |
| 6,047,316 A | 4/2000 | Barton et al. |
| 6,101,574 A | 8/2000 | Kumasawa et al. |
| 6,212,568 B1 | 4/2001 | Miller et al. |
| 6,223,258 B1 | 4/2001 | Palenca et al. |
| 6,427,188 B1 | 7/2002 | Lyon et al. |
| 6,442,666 B1 | 8/2002 | Stracovsky |
| 6,480,918 B1 | 11/2002 | McKenney et al. |
| 6,490,654 B2 | 12/2002 | Wickeraad et al. |
| 6,502,171 B1 | 12/2002 | Arimilli et al. |
| 6,549,961 B1 | 4/2003 | Kloth |
| 6,654,953 B1 | 11/2003 | Beaumont et al. |
| 6,751,684 B2 | 6/2004 | Owen et al. |
| 6,792,516 B2 * | 9/2004 | Mastronarde et al. ....... 711/158 |
| 6,823,429 B1 | 11/2004 | Olnowich |

(Continued)

FOREIGN PATENT DOCUMENTS

| | | |
|---|---|---|
| EP | 0 468 786 A1 | 1/1992 |
| EP | 0 681 241 A1 | 11/1995 |
| EP | 0 838 762 A1 | 4/1998 |
| WO | WO 00/38069 A1 | 6/2000 |

OTHER PUBLICATIONS

"HyperTransport I/O Link Specification Revision 1.03", © 2001 HyperTransport Technology Consortium, p. 17-21.*

(Continued)

*Primary Examiner*—Brian R. Peugh

(57) ABSTRACT

A data processor (300) is adapted for use in a non uniform memory access (NUMA) data processing system (10) having a local memory (320) and a remote memory. The data processor (300) includes a central processing unit (302) and a communication link controller (310). The central processing unit (302) executes a plurality of instructions including an atomic instruction on a lock variable, and generates an access request that includes a lock acquire attribute in response to executing the atomic instruction on the lock variable. The communication link controller (310) is coupled to the central processing unit (302) and has an output adapted to be coupled to the remote memory, and selectively provides the access request with the lock acquire attribute to the remote memory if an address of the access request corresponds to the remote memory.

28 Claims, 5 Drawing Sheets

U.S. PATENT DOCUMENTS

| | | | |
|---|---|---|---|
| 6,829,698 B2 * | 12/2004 | Arimilli et al. | ............. 712/208 |
| 6,839,816 B2 | 1/2005 | Borkenhagen et al. | |
| 7,062,610 B2 | 6/2006 | Conway | |
| 7,155,572 B2 | 12/2006 | Hughes et al. | |
| 2002/0087796 A1 | 7/2002 | Fanning | |
| 2003/0154350 A1 | 8/2003 | Edirisooriya et al. | |
| 2003/0163649 A1 | 8/2003 | Kapur et al. | |
| 2004/0019704 A1 | 1/2004 | Sano et al. | |
| 2004/0034747 A1 | 2/2004 | Rowlands et al. | |
| 2004/0128450 A1 | 7/2004 | Edirisooriya et al. | |

OTHER PUBLICATIONS

"*Cache-Coherent Distributed Shared Memory: Perspectives on Its Development and Future Challenges*", John Hennessy, Mark Heinrich, Anoop Gupta, Proceedings of the IEE, vol. 87, No. 3, Mar. 1999, p. 418-429.

"*An Evaluation of Directory Schemes for Cache Coherence*", Anant Agarwal, Richard Simoni, John Hennessy, Mark Horwitz, Computer Systems Laboratory, 1988, p. 280-289.

"Cache Coherence Protocols: Evaluation Using a Multiprocessor Simulation Model." Archibald et al., ACM Transactions on Computer Systems, Association for Computing Machinery, New York, vol. 4, Nov. 1986, ISSN: 0734-2071, p. 281, line 21-p. 282, line 21.

"HyperTransport Technology Consortium; HyperTransport I/O Link Specification," Revision 1.03; Oct. 2001; pp, 17-21.

"Keeping Secrets in Hardware: The Microsoft XBox Case Study," Andrew "bunnie" Huang, May 2002, pp. 1-13.

"Next Generation Packet Processing, RM9000X2 Integrated Multiprocessor with HyperTransport," Rob Reiner, PMC-Sierra, Inc. Jan. 2002, pp. 2-17.

"Multiprocessor Cache Coherency: MOESI Model Describes Snooping Protocol," Microprocessor Report, M. Thorson, Jun. 20, 1990, v4, n11, p. 12(4).

"The Computer Science and Engineering Handbook," Allen B. Tucker et al., 1997, CRC Press, pp. 436-438.

"Generating Editing Environments Based on Relations and Attributes," Susan Horwitz et al., Cornell University, ACM Transactions on Programming Languages and Systems, vol. 8, Nov. 4, Oct. 1986, pp. 577-608.

\* cited by examiner

APPARATUS AND METHOD FOR BALANCED SPINLOCK SUPPORT IN NUMA SYSTEMS

CROSS-REFERENCE TO RELATED, COPENDING APPLICATION

Related subject matter is found in U.S. patent application Ser. No. 10/353,216, filed Jan. 27, 2003, now U.S. Pat. No. 7,155,572, entitled "Method and Apparatus for Injecting Write a Cache," invented by William Hughes and Patrick Conway and assigned to the hereof.

TECHNICAL FIELD OF THE INVENTION

The present invention generally relates to data processing systems, and more particularly relates to non-uniform memory access (NUMA) data processing systems.

BACKGROUND OF THE INVENTION

Some computer systems use multiple processors for higher performance. Early multi-processor systems had a shared main memory to which all processors had access by means of a common bus. However since the bandwidth of the shared bus became a major bottleneck in this multi-processor system, other architectures were developed. Among them is an architecture known as a non-uniform memory access (NUMA) architecture, in which each processor operates on a shared address space but memory is distributed among the processor nodes and memory access time depends on the location of the data in relation to the processor that needs it.

In multiprocessor systems some variables are shared by the nodes. For example in a banking database system many different processors may be able to access a customer's account data. However it is important that only one processor node is allowed to be the owner of the data at a time, and that all processor nodes that are allowed to change the customer's account data receive the right to access the data at some point. Thus NUMA multiprocessor systems put a "lock" around the variable when one user is granted ownership of it, and only release the lock when it is safe to pass ownership rights to another user.

If a given processor node attempts to read a variable which is already owned and hence locked by another node, it is not allowed the right to change the variable until, at least, the owner relinquishes it. There may also be other processors that desire to own the variable at the same time and that may be given priority over the given processor. Hence each processor that attempts to become the owner of a shared variable must wait for the lock to be released and then attempt to acquire the lock before another processor does. Typically these processors can be stuck executing a tight loop of instructions known as a "spinlock" to detect the lock release and these processors are said to be "spinning".

Spinlocks can cause unbalanced performance in NUMA systems. Performance instability results from the fact that nodes which are physically close to the home node of a lock variable have a higher probability of acquiring a released lock variable than nodes that are far away. The net effect is that remote nodes are under-utilized because they spend more time spinning and less time working. The utilization of the processor nodes literally becomes a function of their proximity to lock variables. Proximity in turn varies based on where tasks are scheduled and where memory is allocated. System performance thus becomes erratic and generally unstable.

Accordingly, it is desirable to provide a method and apparatus for providing stability in NUMA systems. This and other desirable features and characteristics of the present invention will become apparent from the subsequent detailed description and the appended claims, taken in conjunction with the accompanying drawings and the foregoing technical field and background.

BRIEF SUMMARY OF THE INVENTION

A data processor is provided that is adapted for use in a non uniform memory access (NUMA) data processing system having a local memory and a remote memory. The data processor includes a central processing unit and a communication link controller. The central processing unit executes a plurality of instructions including an atomic instruction on a lock variable, and generates an access request that includes a lock acquire attribute in response to executing the atomic instruction on the lock variable. The communication link controller is coupled to the central processing unit and has an output adapted to be coupled to the remote memory for selectively providing the access request with the lock acquire attribute to the remote memory if an address of the access request corresponds to the remote memory.

A method is also provided for use in a non-uniform memory access (NUMA) data processing system for guaranteeing fair access to a lock variable among a plurality of processor nodes. A first access request with a lock acquire attribute for the lock variable is received from a first processor node. A second access request with a lock acquire attribute for the lock variable is received from a second processor node within a predetermined length of time after receiving the first access request. A lock winner is determined as one of the first and second processor nodes that is next after a current owner of the lock variable in a predetermined order. Ownership of the lock variable is granted to the lock winner.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
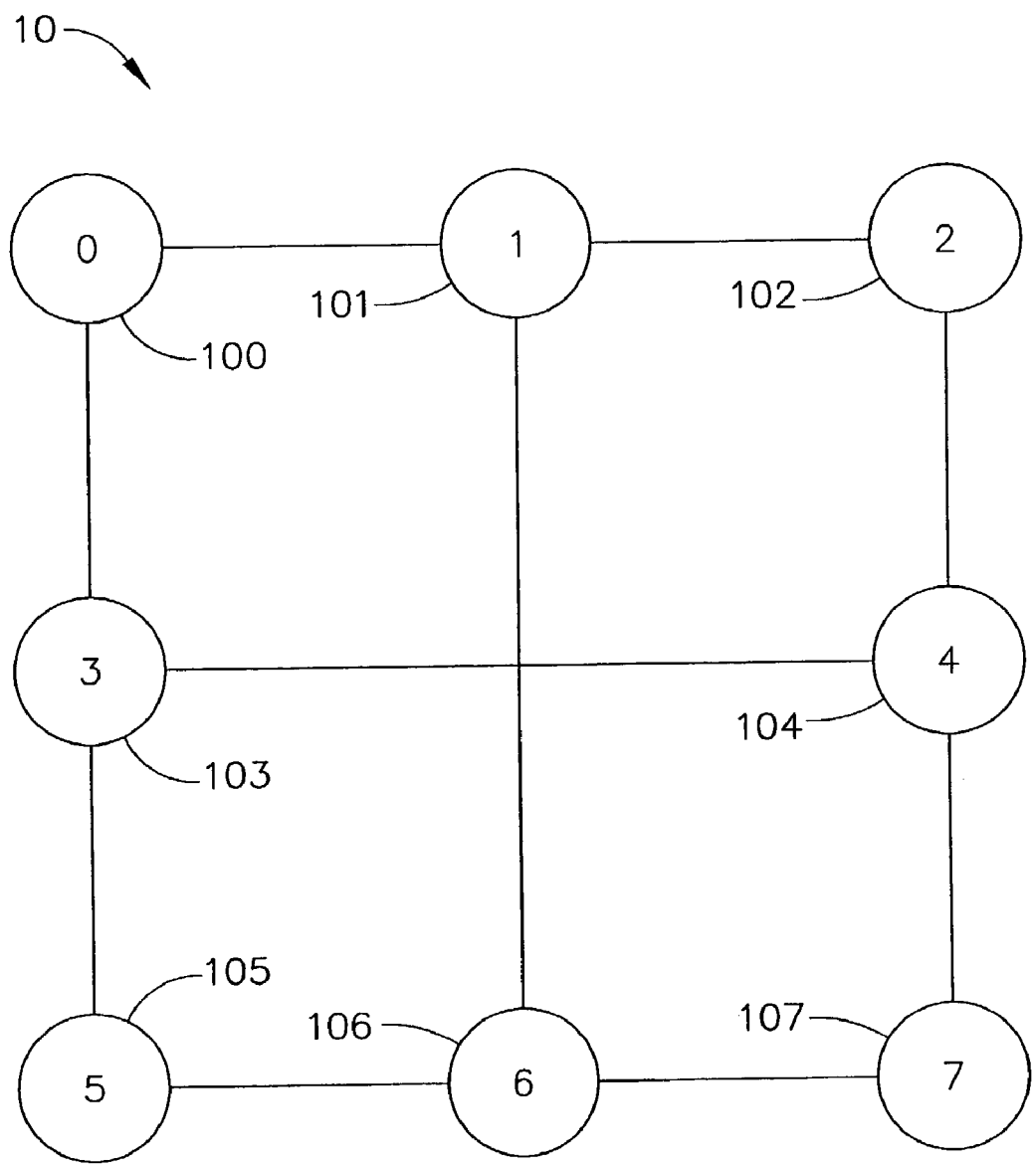
FIG. 1 illustrates a block diagram of a non-uniform memory access (NUMA) system having eight processors.

FIG. 1 illustrates a block diagram of a non-uniform memory access (NUMA) system 10 having eight nodes 100-107 illustrated as circles with a corresponding node number inside the circle. The eight nodes are connected at corresponding points in a 3-by-3 matrix (except for the center point) such that node 100 is in the first column of the first row and is connected to adjacent node 101 in the second column of the first row, and to adjacent node 103 in the first column of the second row; node 101 is connected to node 100, to node 106 in the second column of the third row, and to node 102 in the third column of the first row; and so on. The connections are effected by means of a coherent form of a communication protocol known as "HyperTransport". Each coherent HyperTransport link uses the physical interface and the packet structure defined by the HyperTransport™ I/O Link Specification, Revision 1.03, © 2001 HyperTransport Technology Consortium. However coherent HyperTransport uses packet commands reserved for the host, designated "Reserved-HOST" in the I/O Link Specification, to implement NUMA system 10. It should be apparent that HyperTransport is one possible inter-node communication protocol but other, similar protocols may be used instead.

In FIG. 1 each node includes a processor and local memory. Each processor is able to access a combined memory space including its local memory and remote memory formed by all local memory residing at the other nodes. The memory accesses are non-uniform because accesses to remote memory take longer than accesses to local memory because the requests must travel around the matrix in "hops".

Figure 2:
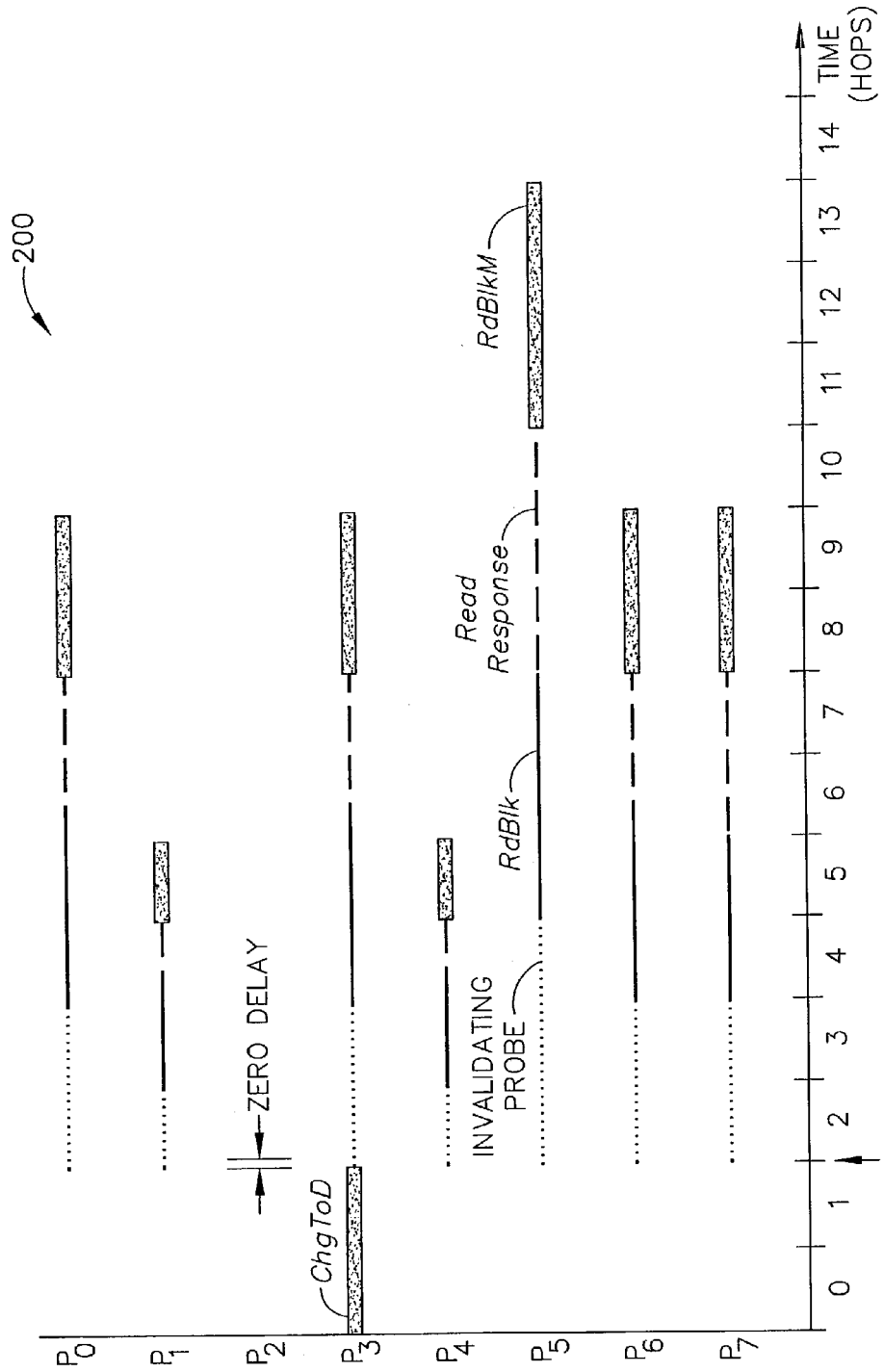
FIG. 2 illustrates a timing diagram of a contention for a lock variable that can occur in the NUMA system of FIG. 1.

The non-uniform memory access time creates a bias in favor of nodes that are closest to the home node for a lock variable. Suppose for example node 3 owns a lock variable and node 2 is the home node for the data. FIG. 2 illustrates a timing diagram 200 of a contention for this lock variable that can occur in NUMA system 10 of FIG. 1. In FIG. 2 the horizontal axis represents time, denoted in hops. Each hop represents the time it takes a message to travel from one node to an adjacent node. In the vertical direction activity at processors labeled "P0", "P1", etc. correspond to nodes 0, 1 etc. in FIG. 1. As shown in FIG. 2, the home node of the lock variable is node 2, and node 3 is the initial lock owner. When P3 releases the lock by writing a particular bit in the lock variable known as a semaphore bit to a binary 0, it sends a coherent HyperTransport packet known as change to dirty, or "ChgToD". When this packet arrives at node 2 after two hops, node 2 issues invalidating probes to all nodes that have a shared copy to notify them that their local copy is stale. In the illustrated example, all other nodes in the system have been spinning waiting to acquire a lock for the lock variable. These invalidating probes arrive at the processors based on their proximity to P2. Thus the probe is received at P2 after a zero-hop delay, at P1 and P4 after a one-hop delay, at P0, P3, P6, and P7 after a two-hop delay, and at P5 after a three-hop delay.

Since all the processors are attempting to obtain the lock, they quickly send a request packet known as "RdBlk" to test the updated state of the lock variable. This packet requests a copy of the data element by encoding RdBlk in the command (Cmd) field of the HyperTransport packet and specifying the address of the data element. The RdBlk packet also travels around NUMA system 10 in hops and these packets arrive at P2 at times based on their proximity. P2 then sends a read response packet with a shared copy of the lock variable. Since the semaphore bit now has the unlocked value of binary 0, each contending processor attempts to acquire the lock by sending a request packet which signals an intent to modify, known as a RdBlkM packet. Because in this example all other processors have been spinning waiting for release of the lock, when the lock is finally released P2 receives a large number of attempts to own the lock in a short period of time. This phenomenon is known as the "thundering herd".

A simple system would grant ownership of the lock on a first come, first serve basis. Since many processors are attempting to obtain the lock, the processor that is physically closest to the lock variable has a bias in favor of getting the lock. In this example P2 would get ownership of the lock variable. Ownership is granted by sending a copy of the lock variable with the semaphore bit in the binary 0 state. P2 then stores the lock variable in its cache, and writes the semaphore bit to a binary 1 to indicate that the data element is owned. Any further polling of the lock variable by other nodes will result in P2 returning a copy with the semaphore bit in the 1 state. P5 is the farthest node from the home node and will never win the contention unless there are no other active contenders. This bias in favor of nodes physically close to the lock variable causes unbalanced system operation since P2 can access the lock variable frequently while P5 spends considerable time spinning and thus performing no useful work.

Figure 3:
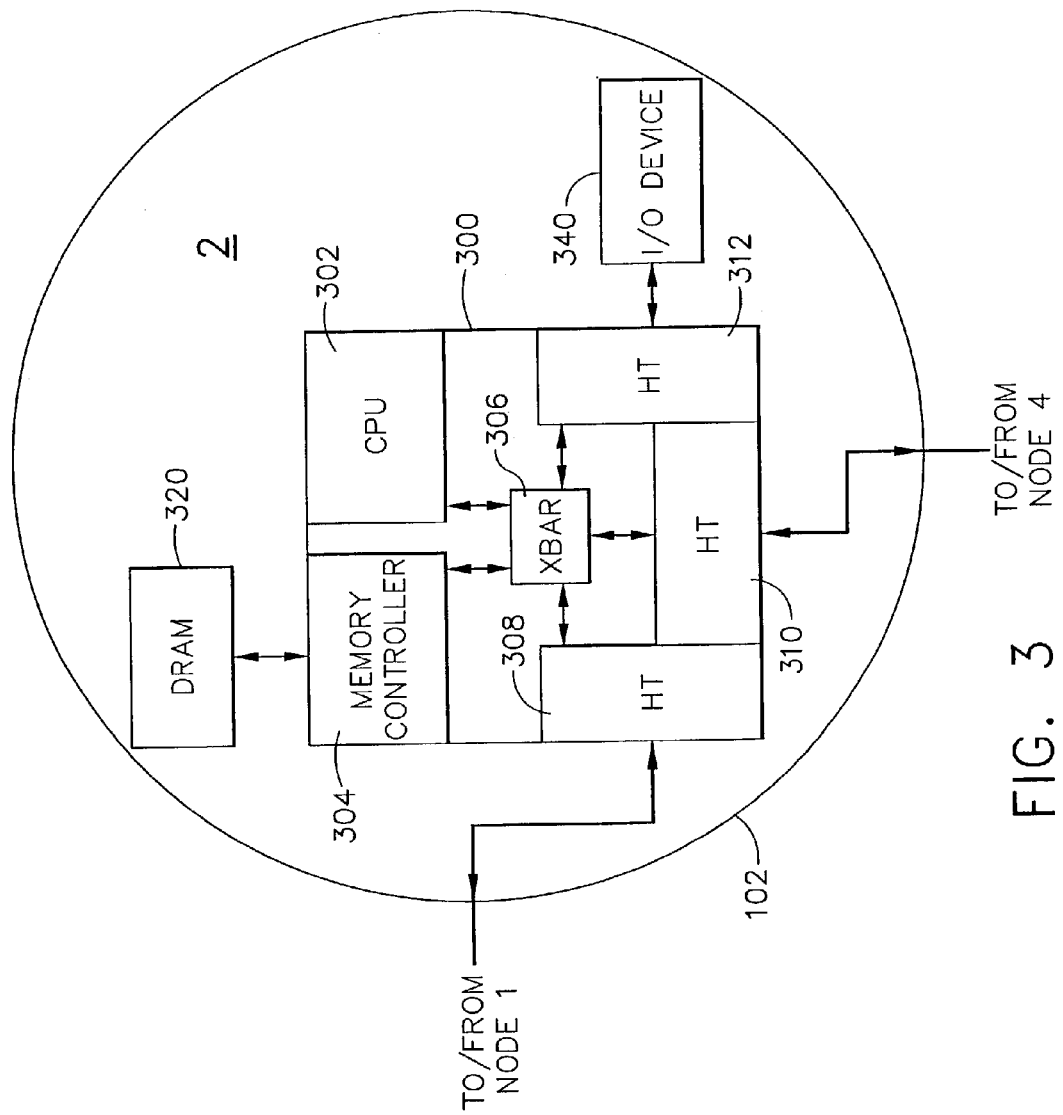
FIG. 3 illustrates a block diagram of a processing node having balanced spinlock support for use in the NUMA system of FIG. 1 according to the present invention.

FIG. 3 illustrates a block diagram of processing node 102 having balanced spinlock support for use in NUMA system 10 of FIG. 1 according to the present invention. When processing node 102 attempts to obtain ownership of a lock variable, it signals a special lock acquire attribute to tell the home node that it is attempting to acquire ownership of a lock variable. When processing node 102 is the home node for a lock variable, it senses when multiple nodes are competing for ownership of the lock variable and grants ownership in a fair manner to ensure balanced operation of the whole system. These features will be more fully described below.

Processor node 102 includes generally a data processor in the form of a single-chip microprocessor 300, a dynamic random access memory (DRAM) 320, and an input/output (I/O) device 340. Microprocessor 300 includes generally a central processing unit (CPU) 302, a memory controller 304, a crossbar switch labeled "XBAR" 306, and three communication link controllers 308, 310, and 312 each labeled "HT" for HyperTransport, described more fully below. CPU 302 is a processor adapted to execute instructions of the so-called x86 instruction set. The x86 instruction set is based on the instruction set of the 8086 microprocessor first manufactured by Intel Corporation of Santa Clara, Calif. CPU 302 however includes many sophisticated features for high-performance execution of x86 programs including pipelining and superscalar design. CPU 302 also includes a level one data cache and a separate level one instruction cache, and a combined level two instruction and data cache.

Memory controller 304 is the mechanism for data transfer between microprocessor 300 and DRAM 320 which functions as a local memory, and between other system nodes and the local memory. Memory controller 304 offloads the task of initiating and terminating memory accesses from CPU 402. It includes internal queues to allow efficient use of the external bus to DRAM 320, and a directory mechanism for determining ownership and state of data in the local memory. In other embodiments DRAM 320 could be replaced by a lower-level memory system including one or more additional caches and main memory, by static RAM, by nonvolatile memory, etc.

XBAR 306 is a switching/multiplexing circuit designed to couple together the buses internal to microprocessor 300.

HT link controllers 308, 310, and 312 are coupled to devices external to microprocessor 300 over corresponding input and output channels. Each of HT link controllers 308, 310, and 312 complies with the physical interface specified in the HyperTransport I/O Link Specification. In node 102 HT link controllers 308 and 310 function as coherent links that communicate with nodes 101 and 104 of FIG. 1, respectively, using a coherent form of HyperTransport. HT link controller 312 functions as a host bridge that communicates with I/O device 340 using the non-coherent form of HyperTransport.

I/O device 340 is an input/output device that, for example, implements the local area network communication protocol standardized by the Institute of Electrical and Electronics Engineers (IEEE) under the auspices of the IEEE 802.3 committee, commonly referred to as "Ethernet". However other types of I/O functions are possible as well.

Other nodes in system 10 assume the same basic configuration as node 102. However, nodes 1, 3, 4, and 6 use all three available HT link controllers for coherent HyperTransport links between adjacent processor nodes. Remaining nodes 0, 2, 5, and 7 have an additional HT link controller available for use as a host bridge for connection to I/O devices using non-coherent HyperTransport links.

Microprocessor 300 implements two mechanisms to provide balanced spinlock support. First, CPU 302 provides a special RdBlkM packet with a lock acquire attribute in response to executing an atomic instruction. In the x86 instruction set, there are several atomic instructions: Bit Test and Set (BTS), Bit Test and Complement (BTC), Bit Test and Reset (BTR), Exchange and Add (XADD), Exchange Register/Memory with Register (XCHG), Compare and Exchange (CMPXCHG, CMPXCGH8B, and CMPXCHG16B). In addition there is a mechanism to assert an external control signal to signify a lock event by preceding an atomic instruction (or any of a number of instructions) by a LOCK prefix, opcode F0 hex, as described in the *IA-32 Intel Architecture Software Developer's Manual*, Volume 2 Instruction Set Reference, © 1997-2001 by the Intel Corporation (Order Number 245471), pages 2-1, 3-389 and 3-390.

In response to decoding and executing an atomic instruction, CPU 302 presents the RdBlkM packet with the lock acquire attribute to one of HT link controllers 308 and 310 that will be part of the path back to the home node of the data element. A normal RdBlkM packet (i.e., without a lock acquire attribute) is encoded by using a particular bit pattern in the Cmd field. The special RdBlkM packet with the lock acquire attribute uses the same Cmd field encoding but uses other bits to signify the lock acquire attribute. This new packet is better understood with reference to FIG. 4, which illustrates an encoding table 400 of a HyperTransport packet that can be used to form an access request packet with a lock acquire attribute. The general packet structure used is known as the request packet with address. The packet is four bytes long with an additional four-byte address extension.

The various fields associated with packet 400 will now be described. Cmd[5:0] is the command field which defines the packet type, and is equal to 000110 for the RdBlkM packet. SrcUnit[1:0] identifies the unit within the source node which generated the request. DstUnit[1:0] identifies the unit within the destination node to which this packet should be routed. Examples of units in this context are processors, memory controllers and bridges to non-coherent links. DstNode[2:0] identifies the node to which this packet should be routed. Depending on the packet, this field may identify either the source or target node for the transaction associated with this packet. SrcNode[2:0] identifies the original source node for the transaction. SrcTag[4:0] is a transaction tag which together with SrcNode and SrcUnit uniquely identifies the transaction associated with this packet. Each node can have up to 128 transactions in progress in the system. Addr[39:3] represents the 64-byte block address accessed by the request.

In the illustrated embodiment CPU 302 forms the RdBlkM with a lock acquire attribute by using the normal RdBlkM command encoding. However it uses one of the five available reserved bits, labeled "Rsv", to signal the presence of the lock acquire attribute. Note that any of the Rsv bits can be used and either logic state can be used to signify the lock acquire attribute.

Figure 5:
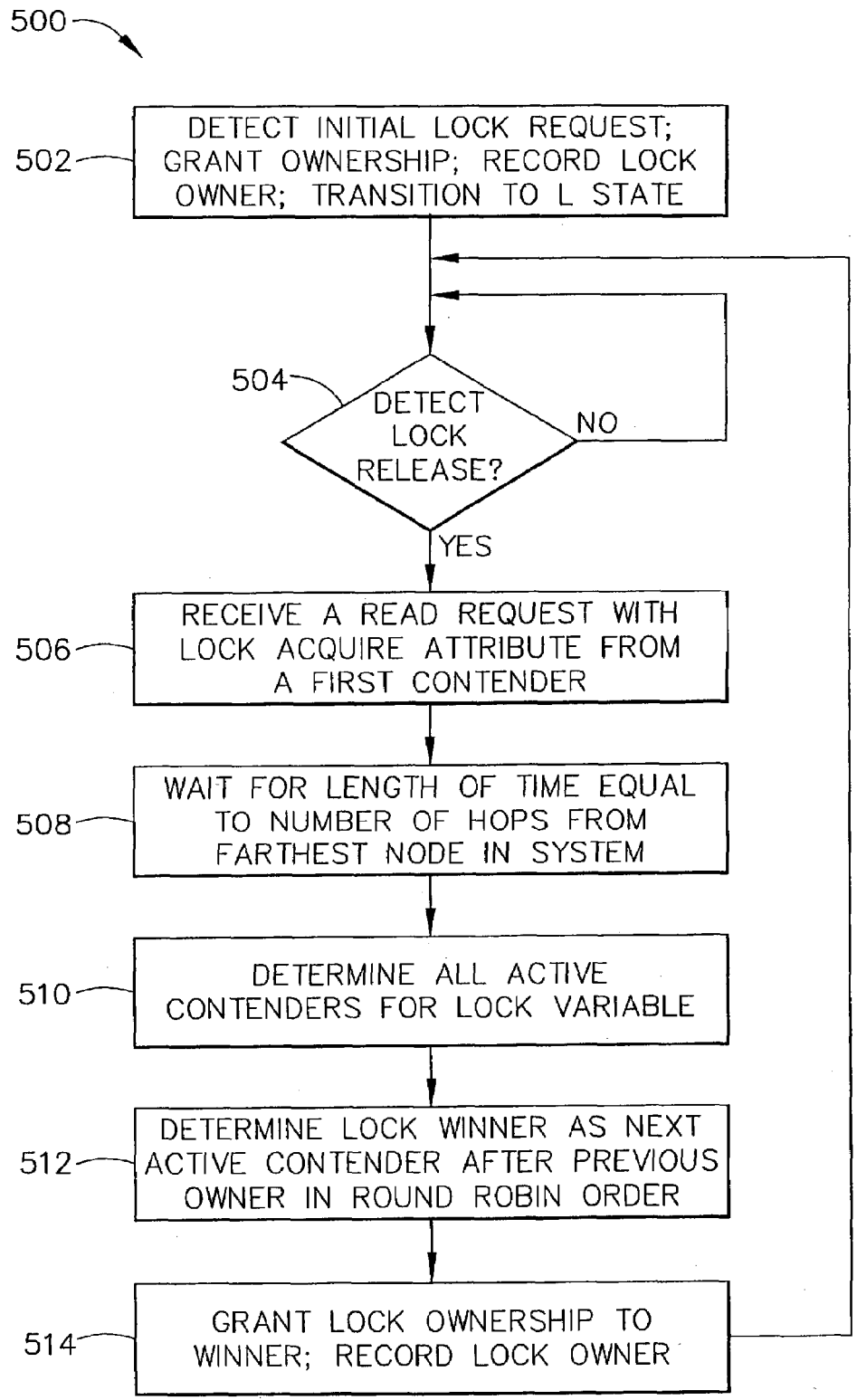
FIG. 5 illustrates a flow chart of the management of a lock variable by the memory controller at the home node of the lock variable.

Returning now to FIG. 3, microprocessor 300 also ensures balanced spinlock support by a second mechanism. When node 102 is the home node of a lock variable, it grants ownership of the lock variable stored in DRAM 320 using an ordered procedure that grants ownership on a fair basis. This ordered procedure is better illustrated with respect to FIG. 5, which illustrates a flow chart 500 of the management of a lock variable when node 102 of FIG. 3 is the home node of the lock variable. At step 502, memory controller 304 detects an initial attempt to gain ownership of a lock variable. This initial attempt is signaled by the receipt of a special RdBlkM packet, that in addition to signaling an intent to modify the data, also has an associated lock acquire attribute as described above.

Step 502 represents the first attempt to obtain ownership of the lock variable, so node 2 grants ownership to the requesting node by sending a read response packet with the lock variable. In addition, however, memory controller 304 adds a new directory state, the L state, to indicate that the data element is a lock variable, and records the node that is the initial lock owner. This information is important for later detecting a lock release as will be described more fully below.

At step 504 memory controller 304 waits for the lock to be released. It has an entry in its directory for the data element containing the lock variable. Since the entry indicates that the data element containing the lock variable is in the L state, the next attempt to write the block will be a lock release. Thus it waits for a ChgToD packet to be received from the lock owner.

When the memory controller detects the lock has been released by the receipt of a ChgToD packet from the lock owner, it then places the line in the LM state, wherein the M bit indicates that the data as been modified. The memory controller 304 waits at step 506 for an attempt to acquire the lock, signaled by a RdBlkM packet with a lock acquire attribute to the same address. The source node of the RdBlkM packet becomes the first contender for the lock variable. However instead of granting the lock to the first contender to send a RdBlkM packet with a lock acquire attribute, memory controller 304 then waits, at step 508, for a predetermined length of time to see if other, more remote nodes in the system have been spinning waiting for the release of the lock. This predetermined length of time is equal to the delay in hops of the farthest node in the system for all the request and response packets associated with this protocol. After the expiration of this length of time, memory controller 304 then determines at step 510 the set of active contenders for the lock variable. Since memory controller 304 now knows the previous owner and the set of contenders, it is able to determine the lock winner in a fair manner. Memory controller 304 determines the lock winner as the next active contender after the last owner in round robin order. In the example of FIG. 2, if all other nodes in the system all issued RdBlkM packets with lock acquire attributes, then node 4 would become the lock winner because it is the next contender in round robin order from the previous owner, node 3. Finally at step 514 the memory controller grants ownership of the lock variable to node 4 by sending a read response packet to node 4. The read response packet contains a copy of the lock variable which node 4 then copies into its local cache in the Modified state. Memory controller 304 then records that the owner is node 4 and places the line into the LM state. Memory controller 304 then services the remaining RdBlkM requests with lock acquire attribute from the other nodes contending for the lock. These lock acquire attempts will fail and the other nodes will resume polling the lock variable in their caches, which transitions the lock variable to the LO state in the cache of node 4, until node 4 releases the lock.

Figures 4, 6:
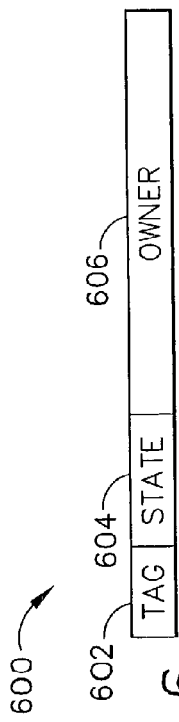
FIG. 4 illustrates an encoding table of a HyperTransport packet that can be used to form an access request packet with a lock acquire attribute.
FIG. 6 illustrates an entry in the directory of the memory controller of FIG. 3.

FIG. 6 illustrates an entry 600 in the directory of memory controller 304 of FIG. 3. Each entry like entry 600 has three fields: a TAG field 602, a STATE field 604, and an ONWER field 606. The TAG field is used to associate a directory entry with a physical address. The OWNER field indicates the existing owner when the line is in the LO state, and the new owner when the line is in the LM state. Three additional directory states are required to implement the balanced spinlock mechanism: the LM, LO and L states. The full set of directory states indicated by the STATE field is listed in TABLE III below, in which the new states are shown in italics:

TABLE III

| State | Abbrev. | Description |
| --- | --- | --- |
| Invalid | I | Uncached or clean cached copy. |
| Written | W | Uncached. The data was last written into main memory by a data producer. |
| Reservation | R | There is exactly one clean cached copy of the data in the owner's cache. |
| *Lock Modified* | *LM* | *The line is modified in the owner's cache. Data in memory is stale. The line contains a lock variable.* |
| Modified | M | The line is modified in the owner's cache. Data in memory is stale. |
| Modified or Exclusive | ME | The line is modified or exclusive at the owner. |
| *Lock Owned* | *LO* | *Line is shared but memory is stale. A line in LO state at the owner must be written back on replacement. The line contains a lock variable.* |
| Owned | O | Line is shared but memory is stale. A line in O state at the owner must be written back on replacement. |
| Uncached | U | An M line has been written back or an E line has been replaced and so the line is guaranteed to not be cached anywhere in the system. |
| *Lock* | *L* | *A line in L state contains a lock. The line may be shared clean in a cache. The copy in memory is current.* |

The general use of the directory states is as follows. The Invalid (I) state indicates the line is not cached in any cache in the system. A read request to a line in the I state results in an access to the lower level memory system. The Uncached (U) state indicates that the Modified line has been written back by a caching agent and is guaranteed to not be cached anywhere in the system. The Modified/Exclusive (ME) state indicates that the line has been read by a caching agent for read/write access. When the directory entry for a particular cache line is in the ME state, the caching agent may have the data in either the E state or the M state in its local cache. If the caching agent has the line in the E state, then it has read/write permission for its copy of the line, but it has not yet written to the line. If the caching agent has the line in the M state, then it has read-write permission for its cached copy of the line and it has already modified the data. When the caching agent has the line in the M state in its cache, then the data in memory is stale. The line is first installed in the caching agent in the E state and subsequently transitions to the M state when it is modified. Exactly one node in the system can have read/write access to the line. Any read request to a line in the ME state at the directory must first check to see where the most up-to-date copy in the system is. If the most recent data is in the processor cache, that processor must supply the line. If the processor has the cache line in the E state, then the line is invalidated (placed in the I state) in the processor cache and is supplied by the memory agent. When a line in ME state is read, the directory entry transitions to Owned (O) state to indicate that the data in memory is stale and also that there are sharers. Lock Modified (LM) state indicates that a line is Modified and additionally that the line contains a lock variable. Lock Owned (LO) state indicates that a line is Owned and additionally that the line contains a lock variable. The Lock (L) state indicates that the line contains a lock variable and that the copy in memory is current and may be cached clean.

In addition to using the new LM, LO and L directory states, memory controller 304 may implement other techniques for determining when the lock variable has been released. One such technique uses a release history buffer. The memory controller keeps the release history buffer for the last N stores without lock acquire attribute with the address and node that the store came from. The memory controller creates the entries in the release history buffer in response to RdBlkM and ChgToD requests. When a RdBlkM with a lock acquire attribute arrives, the memory controller examines the release history buffer for a recent store to the same address. If there was a recent release, then the memory controller waits for a programmed interval that is greater than the time it takes for a lock acquire request from the most distant node to arrive. After this interval, the memory controller examines all the lock acquire requests that have been received. It reorders the lock acquire requests to pass the lock in round robin order following the node stored in the history buffer. It then clears the store release entry in the history buffer. If there is no recent release present in the release history buffer, the memory controller 304 randomly orders the lock acquire requests and services them.

In the illustrated embodiment the ordered procedure for granting fair access to the lock variable was in round robin order. In other embodiments other ordered procedures for fair access are possible. Examples include reverse round robin order, an arbitrary order among all the nodes, historically balanced order, and random order. Note also that while the inter-node communication links were formed by coherent HyperTransport, other communication protocols may be used as well. The illustrated NUMA system included eight processors in a matrix but the spinlock support feature is useful for different topologies and is useful in NUMA systems having as few as two nodes. Note also that not all nodes in the system need to have processors associated with them.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A data processor for use in a first node of a data processing system, comprising:
   a central processing unit;
   a memory controller coupled to said central processing unit and adapted to be coupled to a local memory that stores a lock variable, said memory controller comprising means for determining, using a release history table, when a current owner releases said lock variable;
   a communication link controller coupled to said memory controller and adapted to receive an access request with a lock acquire attribute for said lock variable from a second node; and
   wherein said memory controller grants ownership of the lock variable to said second node selectively according to a predetermined priority scheme in response to receiving said access request with said lock acquire attribute for said lock variable.

2. The data processor of claim 1 wherein said predetermined priority scheme comprises granting ownership of said lock variable to said second node if said access request with said lock acquire attribute is a first such request.

3. The data processor of claim 1 wherein said predetermined priority scheme comprises round robin order among a plurality of processing nodes including the first node and said second node.

4. The data processor of claim 3 wherein the current owner of said lock variable comprises the first node.

5. The data processor of claim 3 wherein said communication link controller is characterized as being substantially compatible with the HyperTransport™ I/O Link Specification, Revision 1.03.

6. The data processor of claim 1 wherein said means for determining further comprises a directory.

7. The data processor of claim 6 wherein said directory has an entry associated with said lock variable for storing a plurality of states including a lock state, and having a field for defining a current owner of said lock variable, wherein said memory controller determines that said current owner has released said lock variable when said current owner issues a next store after receiving ownership of said lock variable.

8. The data processor of claim 1 wherein said data processing system comprises a non-uniform memory access (NUMA) data processing system.

9. A node for use in a data processing system having a plurality of nodes comprising:
   a local memory for storing a plurality of data elements including a lock variable;
   communication means coupled to a plurality of adjacent nodes in the data processing system for receiving ownership requests for said lock variable and for granting ownership of said lock variable to a lock winner; and
   controller means coupled to said local memory and to said communication means for determining said lock winner by selecting one of a plurality of ownership requests received during a predetermined period of time that is next in a predetermined order, said predetermined period of time corresponding to a delay from a farthest node in the data processing system.

10. The node of claim 9 wherein said communication means comprises a plurality of communication link controllers each substantially compatible with the HyperTransport™ I/O Link Specification, Revision 1.03.

11. The node of claim 9 wherein said predetermined order comprises round robin order.

12. The node of claim 9 wherein said data processing system comprises a non-uniform memory access (NUMA) data processing system.

13. The node of claim 9 further comprising a central processing unit coupled to said local memory.

14. In a data processing system, a method for guaranteeing fair access to a lock variable among a plurality of processor nodes comprising the steps of:
   receiving a first access request with a lock acquire attribute for the lock variable from a first processor node;
   receiving a second access request with a lock acquire attribute for the lock variable from a second processor node within a predetermined length of time after receiving said first access request;
   determining, in response to an expiry of said predetermined length of time subsequent to receiving said first access request, a lock winner as one of said first and second processor nodes that is next after a current owner of the lock variable in a predetermined order; and
   granting ownership of the lock variable to said lock winner.

15. The method of claim 14 further comprising the steps of receiving said first and second access requests at a home node for the lock variable.

16. The method of claim 14 further comprising performing said steps of receiving said first access request, receiving said second access request, determining said lock winner, and granting ownership after performing the steps of:
   granting ownership to the lock variable to an initial processor node in response to detecting an initial access request with a lock acquire attribute for the lock variable; and
   detecting when said initial processor node releases the lock variable.

17. The method of claim 14 wherein said data processing system comprises a non-uniform memory access (NUMA) data processing system.

18. The method of claim 14 wherein said step of determining said lock winner further comprises the step of determining said lock winner as one of said first and second processor nodes that is next in a round robin order after said current owner of the lock variable.

19. The method of claim 14 wherein said step of determining said lock winner comprises the step of determining said lock winner based on a priority scheme.

20. A data processor for use in a first node of a plurality of nodes of a data processing system, comprising:
   a communication link controller adapted to communicate access a plurality of requests from said plurality of nodes of said data processing system, said plurality of access requests including an access request from a second node of the plurality of nodes; and a memory controller adapted to:
  receive said plurality of access requests having a lock acquire attribute for a lock variable within a predetermined amount of time subsequent to detecting release of a lock on said lock variable; and
  selectively grant ownership of said lock variable to said second node of said plurality of nodes in response to an expiry of said predetermined amount of time.

21. The data processor of claim 20 wherein said memory controller is adapted to selectively grant ownership of said lock variable based on a predetermined priority scheme.

22. The data processor of claim 21 wherein said predetermined priority scheme comprises a round robin order.

23. The data processor of claim 20 wherein said memory controller comprises means for detecting release of said lock.

24. The data processor of claim 23 wherein said means comprises a directory.

25. The data processor of claim 24 wherein said directory has an entry associated with said lock variable for storing a plurality of states including a lock state, and having a field for defining a current owner of said lock variable, wherein said memory controller determines that said current owner has released said lock variable when said current owner issues a next store after receiving ownership of said lock variable.

26. The data processor of claim 23 wherein said means comprises a release history table.

27. The data processor of claim 20 wherein said predetermined amount of time is initiated in response to receipt of the first of the plurality of access requests by the memory controller.

28. The data processor of claim 20 wherein said data processing system comprises a non-uniform memory access (NUMA) data processing system.

* * * * *